United States Patent [19]
Norell

[11] Patent Number: 5,333,178
[45] Date of Patent: Jul. 26, 1994

[54] MOBILE TELEPHONE NETWORK STRUCTURE

[75] Inventor: Bror L. Norell, Alvsjo, Sweden

[73] Assignee: Telefonaktiebolaget L M Ericsson, Stockholm, Sweden

[21] Appl. No.: 819,799

[22] Filed: Jan. 13, 1992

[30] Foreign Application Priority Data

Jan. 14, 1991 [SE] Sweden ............................ 9100117-2

[51] Int. Cl.⁵ ..................... H04M 11/00; H04Q 7/00; H04B 1/00
[52] U.S. Cl. ........................................ 379/59; 379/58; 379/60; 379/63; 455/33.1; 455/54.1; 455/56.1; 340/905; 340/907
[58] Field of Search .................. 379/58, 59, 60, 63; 455/33.1, 54.1, 56.1; 340/905, 907

[56] References Cited

U.S. PATENT DOCUMENTS

| | | | |
|---|---|---|---|
| 3,906,166 | 9/1975 | Cooper et al. | 455/56.1 |
| 4,398,063 | 8/1983 | Hass et al. | 179/2 EB |
| 4,562,572 | 12/1985 | Goldman et al. | 455/33.1 |
| 4,823,362 | 4/1989 | Etoh | 379/59 |
| 4,912,756 | 3/1990 | Hop | 379/59 |
| 4,980,907 | 12/1990 | Raith et al. | 379/58 |
| 5,036,531 | 7/1991 | Spear | 379/59 |
| 5,070,521 | 12/1991 | Warner et al. | 379/63 |
| 5,090,051 | 2/1992 | Muppidi et al. | 379/63 |
| 5,187,810 | 2/1993 | Yoneyama et al. | 340/905 |
| 5,203,008 | 4/1993 | Yasuda et al. | 379/63 |
| 5,203,011 | 4/1993 | Bane et al. | 379/63 |

FOREIGN PATENT DOCUMENTS

0285164 10/1988 European Pat. Off.
WO89/07872 8/1989 PCT Int'l Appl.

Primary Examiner—Stephen Chin
Assistant Examiner—Vijay Shankar
Attorney, Agent, or Firm—Burns, Doane, Swecker & Mathis

[57] ABSTRACT in a telecommunication network structure, all functions related to traffic control, including functions for controlling, originating and terminating connections, take place in a mobile service control point while the physical set up of the connections take place in mobile service points which are subordinated to the mobile service control point. Subordinated units are connected to each mobile service point with trunks. A signal net is transferring traffic control signals, including connection control signals, to the subordinated units in which the connections are made, using the trunks.

12 Claims, 6 Drawing Sheets

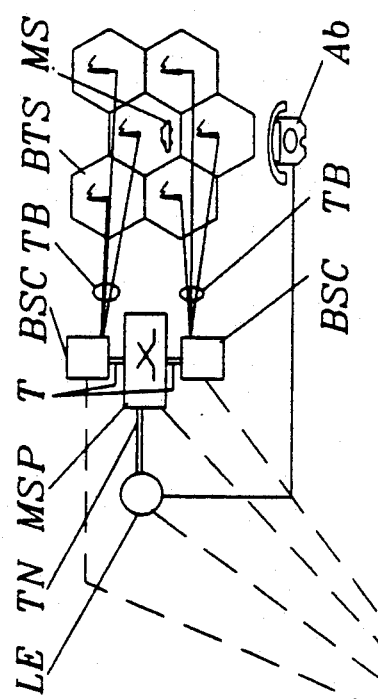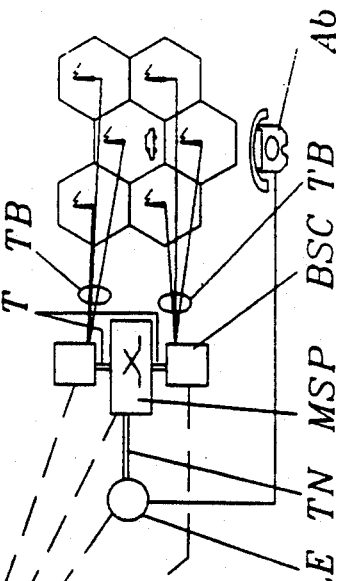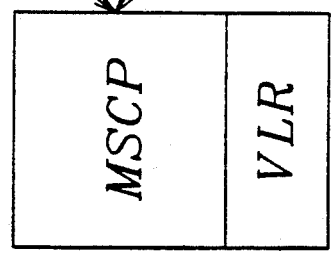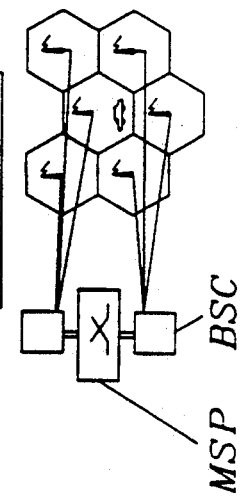
FIG 2

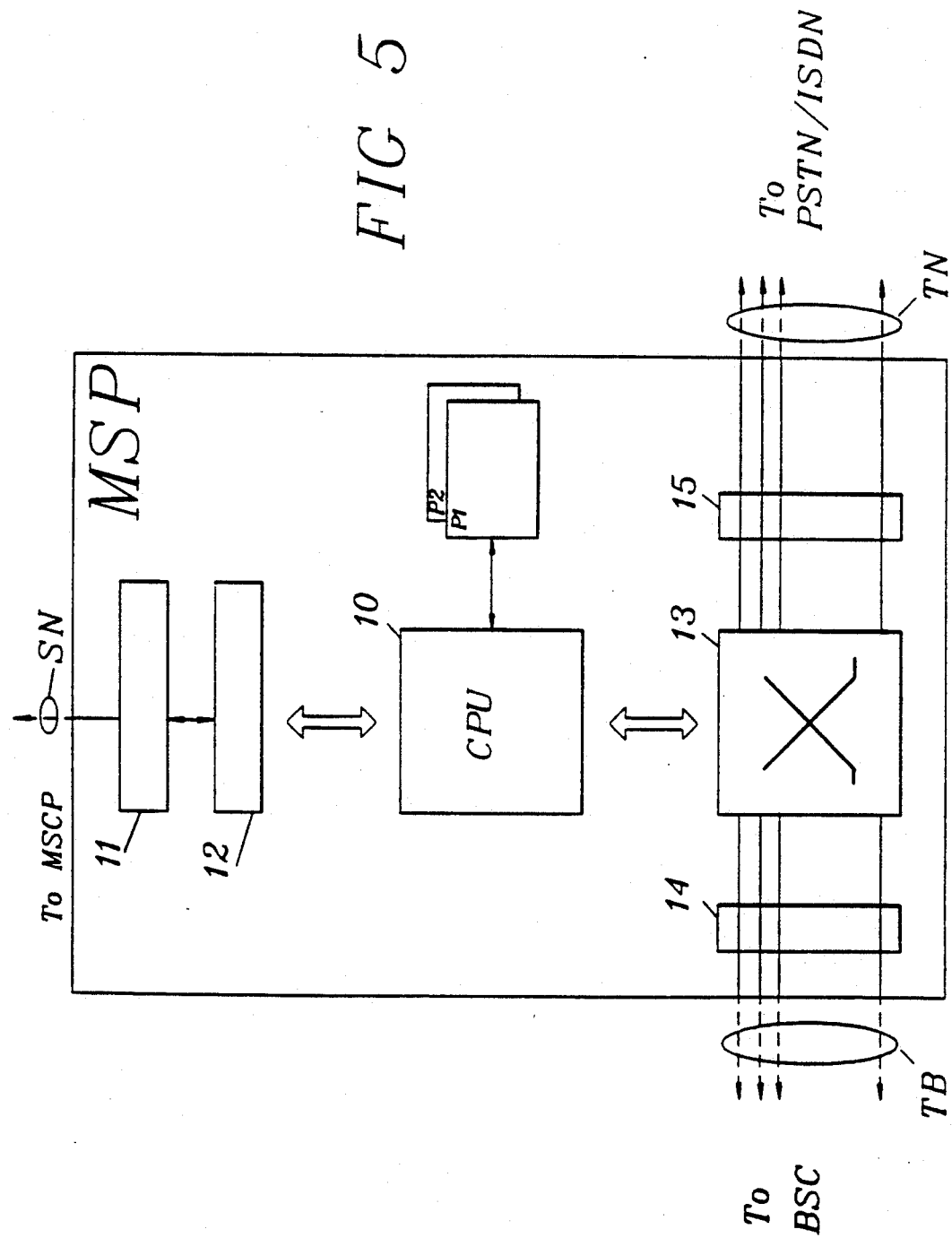

MOBILE TELEPHONE NETWORK STRUCTURE

BACKGROUND

The present invention relates to a telecommunication network structure and in particular to a mobile telephone network structure of the kind which includes a first number of base station control units, each being intended to control a limited number of individual base stations.

A telecommunication network contains a the telephone network (PSTN), a service specific digital network for telephony and data (ISDN), a telex network, a teletext network or a data packet network and combinations thereof.

A mobile station MS, as used in this document, is defined as a mobile telephone, normally a vehicle installed telephone, and also portable telephones which utilize the mobile telephone network. The mobile telephones are able to transmit speech and in some cases also digital data information. The term mobile station shall not be confused with a mobile telephone station, which is a switch for mobile telephone calls. In this document, a mobile telephone station, i.e. a switch for mobile telephone calls, is referred to as a mobile service telephone station.

A network structure of the aforesaid kind is available as a pan-European standard for mobile telephone networks. This standard is referred to popularly as the GSM-system. The GSM-system represents a step forward in the art in comparison with earlier known mobile telephone systems, since signalling between the mobile telephone network and the mobile telephone stations is effected by digital transmission via radio. The GSM-system has a number of base station control units, BSC, subordinated a central mobile service telephone station MSC which is connected to the public telephone network via an extension terminal. The mobile service telephone station MSC includes a switch which enables physical telephone connections to be established, so-called originating and terminating calls.

In addition to establishing telephone connections, the mobile service telephone station MSC also performs other services, such as a billing or charging service for instance, and also incorporates the hand-over and paging functions unique to mobile telephony. The GSM-network structure also includes a so-called home location register in the form of a database in which the subscriber of the mobile station MS and subscriber data are stored. The home location register HLR also stores information relating to the location of the mobile station in the network structure, i.e. the location of the subscriber. The home location register HLR also contains information for establishing a connection to the mobile station MS, so-called routing information.

Also included in the GSM-network structure is a visitor location register VLR, which has the form of a database in which identification data relating to the mobile station which temporarily visits the area served by the mobile service telephone station is normally stored. In addition to this identification data, there is also stored in the visitor location register a copy of the subscriber data which is stored in the home location register for the mobile station. The visitor location register VLR takes information from the home location register HLR when the visitor location register discovers that a new mobile station MS is located in the area covered by the mobile service telephone station. The network structure of the GSM-system also includes other units, such as an authorization-control-database AC which contains secret keys for checking the authorization of each mobile station. The system also includes a database EIR which stores information relating to accepted mobile telephones, black-listed mobile telephones, etc.

A base station BTS comprises a base station transceiver having transmitting and receiving means, antennas, and operating and maintenance means.

The base stations BTS are distributed over a geographical area served by one base station control unit BSC. The base stations BTS are each connected to a main base station control unit BSC by trunk lines.

Permanent connections in the form of so-called trunk lines are also found between each base station control unit BSC and mobile service telephone station MSC, these trunk lines typically consisting of link connections and/or underground cables.

FIG. 1 illustrates a typical example, in which a mobile service telephone station MSC is situated in a first town, called town-X, a first base station control unit BSC is situated in a second town, called town-Y which is situated, e.g., 70 km from town-X for instance, a second base station control unit BSC is located in a third town, called town-Z which is situated, e.g., 70 km from town X and at a distance from town-Y. The majority of the mobile telephone traffic in town-Y, however, is local traffic, i.e. traffic passing between a mobile station MS located in town-Y and a stationary subscriber Ab also located in town-Y. The majority of the mobile telephone traffic in town-Z is also local traffic. All of the telephone connections between the parties in local calls within town-Y are connected through the trunk lines T1 from town-Y to the mobile service telephone station MSC in town-X and back to town-Y via trunk lines. Sound information is thus transmitted through lines over a distance of 140 km, just to provide a connection between two parties who are separated geographically by only some few kilometers. This is highly unsatisfactory with view to the cost of the-trunk lines and the cost of their installation.

It is known in the art to use remote subscriber selector stages in telephony and mobile telephony stations. A remote subscriber selector stage is located geographically close to the area served by the selector stage. Remote subscriber selector stages are used for the purpose of reducing the length of the links. Remote subscriber selector stages are controlled by system specific signals. The system specific signals are transmitted on a dedicated signalling connection between the telephone station and the selector station. Remote subscriber selector stages form an integral part of the telecommunication network and are installed when the telecommunication network is expanded and require common maintenance with the telecommunication network. European Patent No. EP-B1-0 113 662 describes an remote subscriber selector stage but has nothing in common with the present invention, since this patent specification describes a method of multiplexing transceiver control signals so as to enable a central network unit to control several transceiver units.

SUMMARY

The object of the present invention is to provide a net structure for telecommunication networks in which the connection set-up function is separated from the service control function and is incorporated in a standard, preferably digital telephone station. A particular object of the invention is to provide a net structure in which all service control functions are incorporated in one service control station and all connection set-up functions are embodied in local, preferably digital standard telephone stations.

Thus, when the inventive concept is applied to the mobile telephony services, all of the functions characteristic of mobile telephony are incorporated in one service control station and all connection set-up functions are incorporated in local mobile switch stations or points. This enables the mobile switch points to be placed geographically close to the base stations, resulting in short trunk lines.

Short trunk lines can also be obtained when the mobile service telephone station MSC is situated geographically close to its subordinated base station control unit BSC, although this conceivable alternative would necessitate the provision of a large number of mobile service telephone stations MSC, which is disadvantageous with respect to the high cost of each individual mobile service telephone station MSC and with respect to the necessity to upgrade the software in each mobile service telephone station MSC when desiring to introduce a new service into the network. The correction of errors in existing software would also make it necessary to visit many mobile service telephone stations.

The concept of dividing a mobile service telephone station MSC into a service control station and a plurality of switch points in accordance with the invention provides the additional advantage that the switch points need not incorporate service-related software. It is namely necessary to modify service-related software when new services are introduced into the network. The service station or point is operationally reliable, since once it has been installed in the field, there is no need to modify the station when a service change is made in the network. This extends the effective operational life of the service station.

It is possible to place many non-intelligent switch points close to the base station control unit BSC, resulting in short trunk lines. It is then possible to connect locally a telephone call between a base station control unit BSC and the nearest local, permanent telephone station LE. This greatly reduces the transmission costs in a mobile telephone network.

When these objects have been realized, there is obtained a network structure which includes a main central service control station which controls the switch points of the network and which, via a signal net, transmits service control signals (i) to and from the base station control units and (ii) to and from the telecommunication network and switching control signals in only one direction to the switch points. Short trunk lines extend between the base station control units BSC and the switch points, and also between the switch points and the local telephone station LE. All software related to traffic controlling functions and to services are incorporated in the service control station, which in turn is the main controlling station over all switch points.

The nodes of the signal net are comprised of the service control station, the switch points, the base station control units and the local telephone exchanges.

Compared with the remote subscriber selector stages in a telephony or mobile telephony station described in the introduction, the switch points are freestanding elements in the inventive telecommunication network. These switch points communicate with one or more service control stations with functional signals. The functional signals are transmitted over a signal net which is common to the telecommunication network. This signal net may also be used for other purposes. Compared with remote subscriber selector stages, the invention has the advantage that the switch points and the service control stations may be different systemtypes, and may even be manufactured by different manufacturers. Furthermore, existing net elements of the telecommunication network may be reused, by either converting the network elements to switch points or by integrating the switching function in other network elements, for example in a standard telephone station or a base station control unit BSC.

The expression functional signals is intimately connected to the expression functional signalling, which implies that a transmitting net element commands another net element to perform a given function, for example to transfer a call to a subscriber without the transmitting net element having detailed knowledge of the manner in which the commanded net element carries out the function.

BRIEF DESCRIPTION OF THE DRAWINGS

The invention will now be described in more detail with reference to the accompanying drawings, in which

FIG. 2 illustrates the inventive network structure;

FIG. 5 is a block schematic of a service point or station included in the inventive network structure;

DETAILED DESCRIPTION

Figure 1:
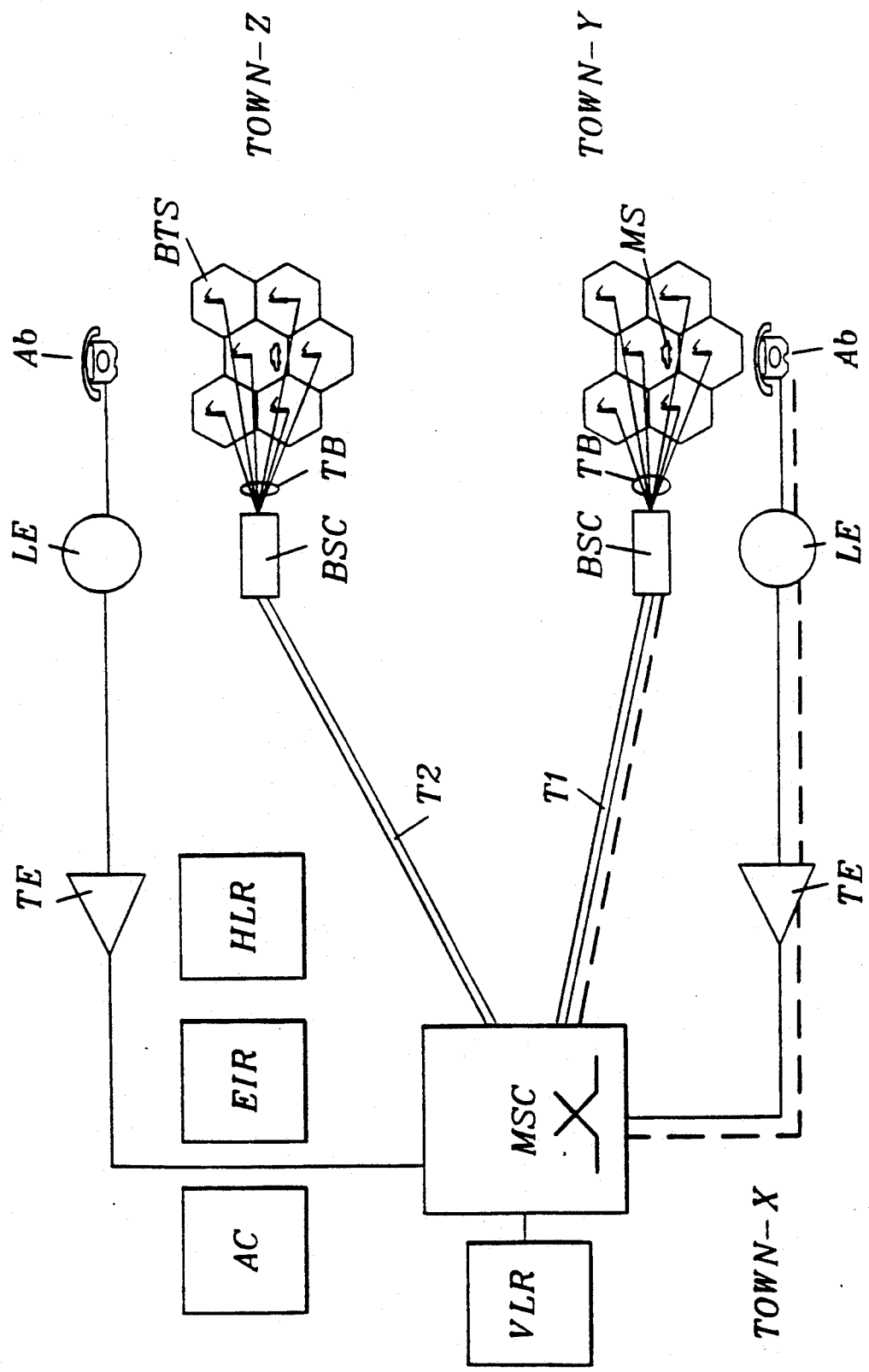
FIG. 1 illustrates schematically the network structure of a conventional GSM-system.

FIG. 1 illustrates the network structure of a conventional GSM-system. Reference MS identifies mobile stations, BST identifies base stations, BSC identifies base station control units, MSC identifies mobile service telephone stations for establishing telephone connections, charging, services and the hand-over and paging functions unique to mobile telephony. The reference HLR identifies a home location register, as described above, and VLR identifies a visitor location register, also described above. The reference AC identifies an authorization database and EIR identifies an equipment identity register, both of which have been described above. Ab identifies telephone subscribers, LE identify a local telephone station and TE a transit telephone station. The broken lines represent a connection set-up of a local call of the kind described in the introduction.

The reference TB identifies trunk lines between the base stations BTS and the main base station control unit BSC. The references T1 and T2 identify trunk lines between the base station control units and the main mobile service telephone station MSC. The trunk lines are, e.g., coaxial cables or so-called fibre cables, i.e. cables formed by fiber-optic conductors buried in the ground.

The manner in which signalling is effected will not be described in detail, since signalling is well known to the person skilled in this field and because signalling does not form part of the present invention.

It will suffice to say that each MS informs the network that it has arrived in a geographical coverage area, referred to as traffic area, which consists of a group of so-called cells, for a new base station BTS, by the transmission of data from MS regarding its positional relationship with BSC, which further transmits this positional data to VLR. If VLR has not previously registered the MS concerned, VLR updates its main home location register HLR and VLR therewith receives subscriber data from HLR. This function which enables an MS to update its geographical position, to ring outgoing connections and to obtain connections irrespective of where MS is located in the network is called roaming.

In order to enable an MS to make a telephone call, it is necessary for the MS to have updated its geographical position, i.e. VLR shall have updated HLR and obtained subscriber data from HLR. The connection from MS functions roughly the same as a connection from a stationary subscriber, i.e. MSC functions as a local station for the connection set-up.

A connection to an MS is always directed to the nearest MSC in the network. This MSC therewith functions as a gateway MSC. Gateway MSC turns to HLR for further routing information concerning the position in the network of the called MS. The earlier positional updating has provided HLR with information as to which VLR is serviced by MS. In response to a command by gateway MSC, HLR will request further direction information from VLR. VLR returns to HLR a so-called roaming number. This roaming number is then transmitted further from HLR to gateway MSC.

The roaming number is now used to direct the connection further through the network to the MSC were MS is located, this MSC being indicated with the aid of the roaming number. Gateway MSC thus effects a number translation from the dialled number to the roaming number and carries out a possible call-charging function. When the connection reaches MSC, the roaming number indicates the called MS and the connection is established.

The drawbacks with this known network structure have been described in the background.

FIG. 2 illustrates the inventive network structure. For the sake of clarity, the elements AC, EIR and HLR have been omitted from the figure.

The network structure illustrated in FIG. 2 is characterized by a plurality of mobile switch points MSP to which a first, predetermined number of base station control units BSC are connected. Each mobile switch point is located physically near its respective connected base station control units BSC.

First trunks T extend between each mobile switch point and its connected base station control units BSC, and second trunks TN extend between each mobile switch point MSP and the telecommunication network, and third trunks TB extend between each base station control unit BSC and its subordinated base stations BTS. The telecommunication network is not shown in detail in FIG. 2 for reasons of clarity, and the Figure shows solely one local stationary telephone station LE and one subscriber line which extends from a subscriber Ab to the local telephone station. Due to the close geographic position of the mobile switch points to their respective base station control units, the trunk lines T are short and therefore inexpensive. The system also incurs low costs.

The inventive network structure also includes a main service control station MSCP which is the main controlling station of a plurality of mobile switch points and which to this end includes means for producing service control signals and means for producing connection control signals. The service control signals concern (i) services and functions which are handled by the mobile telephone network, and (ii) services and functions which are handled by the telecommunication network. The connection control signals concern the path selected for the setting-up of originating and terminating connections in the case of calls between two mobile stations or between a mobile station MS and a stationary telephone subscriber Ab. Service control signals and connection control signals are referred to commonly as traffic control signals.

The main service control station MSCP never forms a physical part of an originating or terminating connection, but merely sends control signals to the mobile switch points for the purpose of establishing such connections. The connection set-up is performed exclusively in the mobile switch points and originating and terminating connections are formed by the trunk lines TB, T and TN.

The traffic control signals from MSCP are delivered over a signal net SN, which is shown in broken lines in FIG. 2. Nodes in this signal net SN are MSCP, all MSP-units and all BSC units. The transmission medium of the signal net may have the form of a metallic cable system, a radio link system, a fiber-optic system, or even a satellite system. The signal net may be a packet switching net or a circuit connected net.

As will be seen from FIG. 2, each MSCP interacts with its respective VLR in the same manner as in the conventional GSM-system. VLR interacts with HLR (not shown) so as to be aware of the geographical location of each MS.

MSCP sends the traffic control signals, including the connection control signals, to MSP and to BSC. The connection control signals inform MSP as to which multiple positions shall be mutually connected in the mobile service point selector. MSCP obtains the information carried by the connection control signals from tables stored in MSP and from tables stored in VLR. The service control signals include conventional signals used in mobile telephony services, such as call signals, digit transfer signals, disconnection signals, paging signals, hand-over signals, etc.

Figure 3:
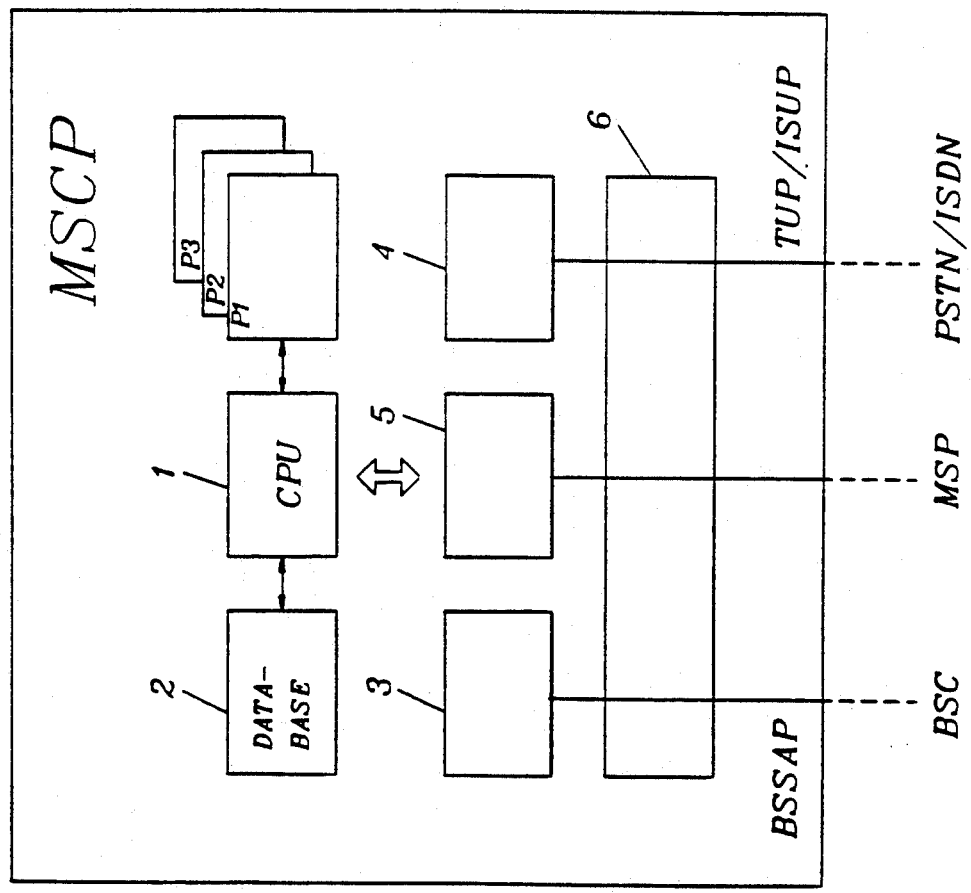
FIG. 3 is a block schematic illustrating a service control station.

FIG. 3 is a block schematic of a service control station. As shown in said Figure, the station includes a central computer 1 which interacts with a plurality of program modules, illustrated schematically at P1, P2, P3, and with a database 2. The program module P1 includes conventional programs which enable mobile telephony services to be performed, whereas the program module P2 includes standard program modules for charging calls, and the program module P3 includes standard program modules for operating and maintaining the service control station. Under the control of the program module P1, the computer 1 produces signals which control a first service control signal generating device 3 for generating service control signals, a second service control signal generating device 4 which also generates service control signals, and a device 5 for generating connection con-trol signals. The signals produced by the devices 3, 4, and 5 are adapted in a physical interface 6 to signals suitable for transmission over the signal net SN. More specifically, the service control signal generating device 3 produces service control signals for transmission to subordinate base station control units BSC. These service control signals are known per se and are comprised of the so-called BSSAP-signals in the standard GSM-network. BSSAP is an abbreviation of Base Station - Subsystem Application Part. The service control signal generating device 4 for producing service control signals produces the TUP-signals known in a standard telephone network, these signals being transmitted in the form of a message packet consisting of frames having a determined structure. When the service control station is connected to an ISDN-net, the signals produced by the service control signal generating device 4 are known ISUP-signals.

Figure 4:
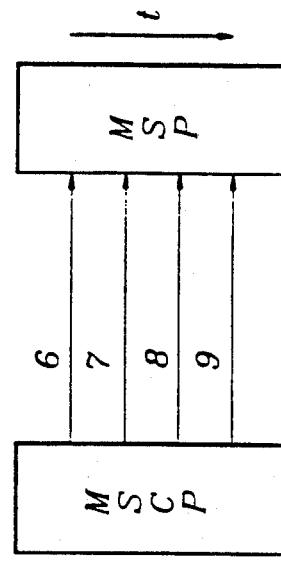
FIG. 4 illustrates the connection control signals from the service control station to subordinated switch points.

The device 5 for producing connection control signals produces the signals 6–9 shown in FIG. 4. These signals 6–9 are delivered from the device 5 in the time sequence illustrated at the vertical arrow t. The signal 6 is a signal for reserving the trunk lines TN and T, the signal 7 is a signal for reserving a path between the trunk lines and consists conventionally of GSMUP-A and GSMUP-B, i.e. the multiple positions which shall be mutually connected in the selector of a mobile switch point. The signal 8 in FIG. 4 is a signal which initiates the establishment of a connection between the reserve trunk lines TN and T. The signal 9 is a signal which initiates disconnection of the established connection path between the parties. In conventional telephone networks, the signals 6–9 are internal signals within a node, e.g. within the node MSC in FIG. 1, although in the novel, inventive network structure, the signals are transmitted between nodes in said structure.

FIG. 5 illustrates a mobile switch point constructed in accordance with the present invention. The service point includes a computer 10 which is controlled by program modules P1 and P2. The program module 1 includes connection control programs, and the program module P2 includes programs for maintaining and operating the service point. The connection control signals from the service control station enter a physical interface 11 via the signal net SN, this interface functioning as an adaptation means. The adapted connection control signals are passed to a means 12 for receiving said connection control signals. Under the control of the program module P1, these signals are converted by the computer 10 and the computer output delivers signals which establish a connection path through a selector 13. The selector 13 has first inputs which via a physical interface 14, e.g. an extension terminal, are connected with a trunk line TB to the base station control unit. The selector 13 also has inputs which are connected with a trunk line TBN of the telecommunication network, via a physical interface 15.

The device 12 for receiving connection control signals is known in the telephony field, but its use in network structures constructed in accordance with the present invention is novel. Since this device 12 is known per se, it need not be described in detail here.

Figure 6:
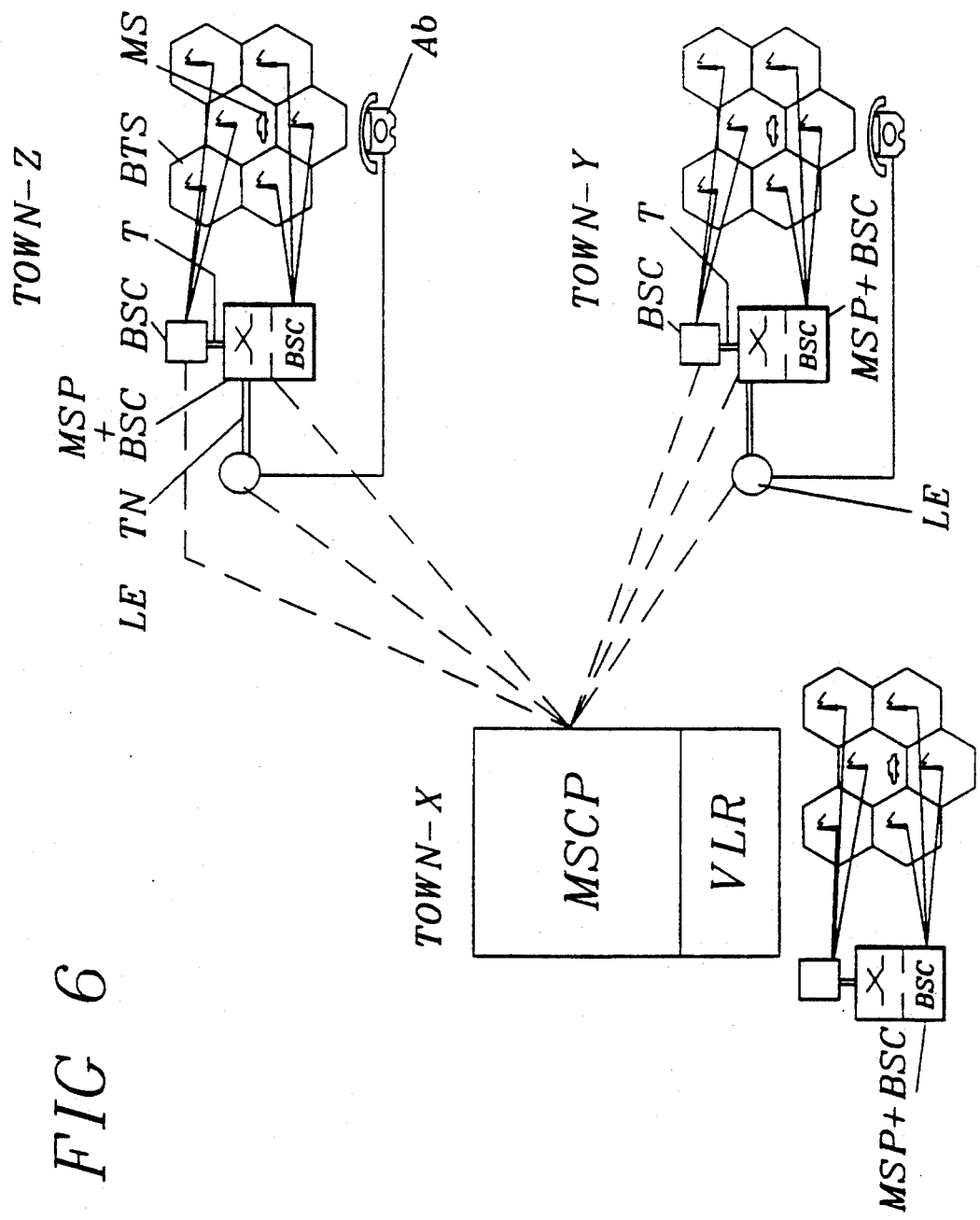
FIG. 6 illustrates schematically a modified inventive network structure.

Finally, FIG. 6 illustrates a modification of the network structure illustrated in FIG. 2. It will be seen from FIG. 6, that each MSP is located close to a BSC, both geographically and physically. More specifically, the mobile switch point is an integral part of a base station control unit BSC and has common connection equipment and common CPU with BSC. The integrated unit MSP+BSC is connected to a local telephone station LE via a trunk line TN and, as shown in full lines, may be connected to a further BSC-unit and to this end is provided with a trunk line T. In other respects, the network is similar to the network illustrated in FIG. 2.

Figure 7:
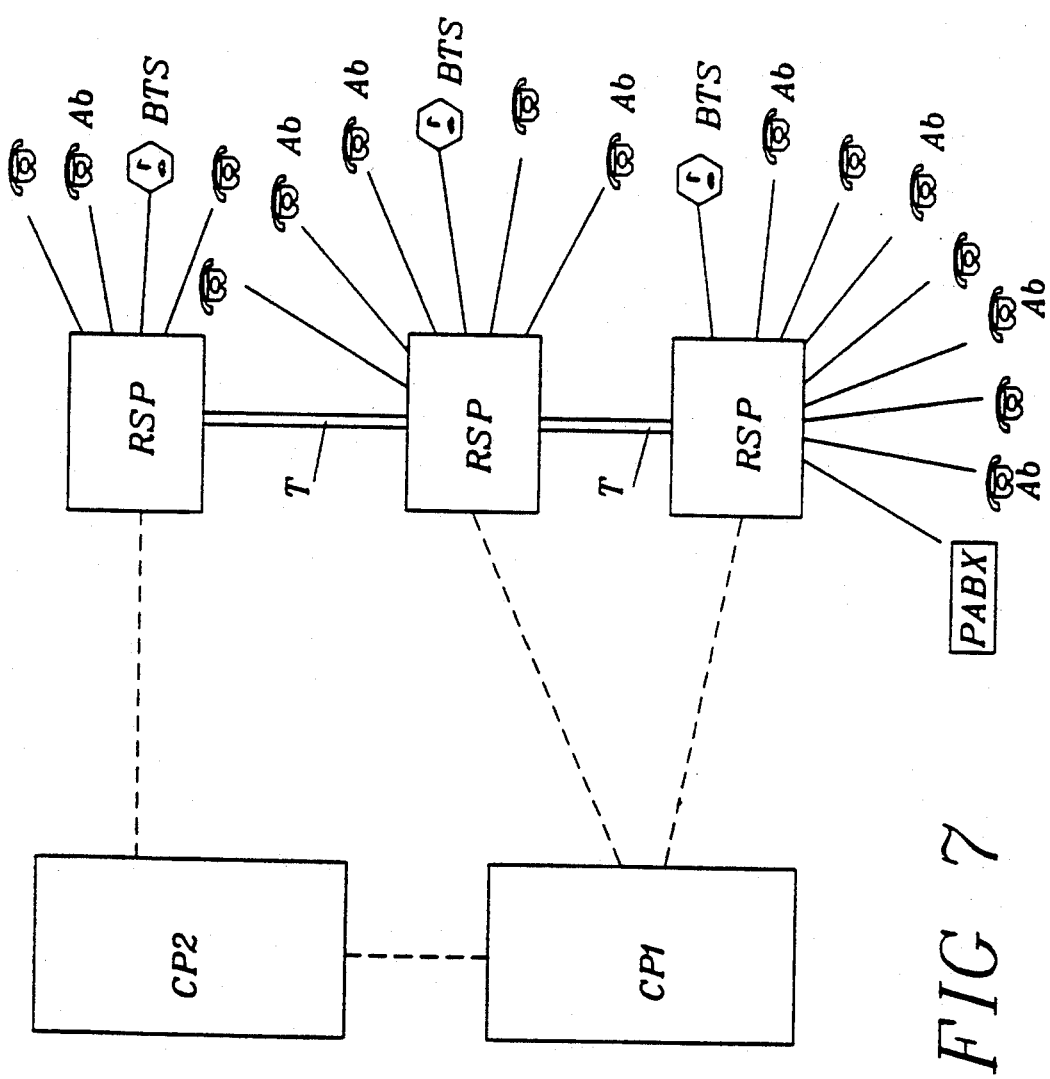
FIG. 7 illustrates schematically a network structure for a General telecommunication network.

FIG. 7 illustrates a network structure for a general telecommunication network, comprised of a plurality of regional service points RSP, of which the two lowermost points are subordinated to a central service control station CP1, whereas the uppermost service point in FIG. 7 is subordinated to a second central service control station CP2. Subscribers Ab are connected to each of the service points. One or more base stations BTS may be connected to the service points. Although not shown, public telephone exchanges PABX may be connected to a service point. The sole function of the regional service points RSP is to establish a connection path between connected subscribers and stations, whereas all service controlling functions are incorporated in the CP-stations. The regional service points RSP are logically "transparent" to all the service controlling signals of subordinate units Ab, BTS, PABX, although separate out signals which concern subscriber line signalling and send the signals to a service control station CP. Between the RSP-units and subordinate service control stations CP, there is effected a transfer of service controlling signals on a signal net SN which may be of the same kind as that described above and which is shown in broken lines in FIG. 7. Trunk lines T are provided between the regional service points RSP. When a subordinated unit, e.g. Ab, in the uppermost service station RSP in FIG. 7, is to be connected to a subordinated unit, e.g. BTS in the lowermost service point RSP in FIG. 7, it is necessary for the uppermost service control station CP2 in FIG. 7 to be connected with the lowermost service control station CP1 in order to enable a connection path to be established between the subscribers. Thus, the signal net SN must also include a signal link between the two service control stations. This is shown by the vertical broken line in FIG. 7.

It is clearly shown in FIG. 7 that compared with the FIG. 2 embodiment the switching function of the base station unit BSC is transferred to RSP, whereas the service functions of the base station unit BSC lie in the service controlling point CP. The service control points CP and the regional service points RSP are constructed in the same manner as that described with reference to FIGS. 3 and 5. The database 2 contains all information relating to all subscribers subordinated to the regional service points RSP which are served by the service control point and also information concerning the service control station to which the subordinated units Ab, BTS and PABX are connected.

Although the embodiments illustrated in FIGS. 2–6 have been described with reference to mobile telephony, it will be seen from the FIG. 7 illustration that the principles fundamental to the present invention can be applied to any chosen telecommunication network.

The illustrated and described embodiments of the invention can be modified and varied within the scope of the following claims.

I claim:

1. A mobile telephony network structure comprising:
   a first number of base station control units each serving a limited number of base stations which in turn serve a plurality of mobile stations;

a central mobile service telephone station common to said first number of base station control units and provided with means for accessing a telecommunication network;

first trunk means for each of the base station control units extending between a base station control unit and the base stations under the control of said base station control unit; and second trunk means extending between each of the base station control units and said central mobile service telephone station, wherein said central mobile service telephone station is divided into:

(a) a central mobile service control station provided with mobile telephony services related software and traffic control related software, and (b) a plurality of mobile switch points each provided with connection related software only;

a signalling network for sending traffic control signals between the central mobile service control station and each of the mobile switch points;

third trunk means extending between each mobile switch point and its associated base station control units.

2. A network structure in accordance with claim 1, wherein said second trunk means form part of said signalling network.

3. A network structure according to claim 1, wherein a mobile switch point has connection means in common with a base station control unit so as to form an integrated unit.

4. A network structure according to claim 3, wherein said mobile telephony structure includes a plurality of integrated units.

5. A network structure according to claim 4, wherein the integrated unit is connected to at least one base station control unit by means of said trunk means.

6. A network structure according to claim 1, wherein a local mobile switch point includes a first physical interface to the telecommunication network, a second physical interface to said first number of base station control units, switching equipment for establishing connections between the first and second physical interfaces and between mobile stations and stationary subscribers in the telecommunication network, wherein the connections are exclusively established through the first, second and third trunk means.

7. A network structure according to claim 1, wherein the mobile service control station includes first and second service control signal generaating means for producing service control signals which are concerned with services and functions, and a third service control signal generating means for producing connection control signals which are concerned with path selection information.

8. A network structure according to claim 7, wherein the connection control signals include a first plurality of signals for reserving trunk lines, a second plurality of signals for reserving paths between the reserved trunk lines, a third plurality of signals for establishing connection paths between the trunk lines, and a fourth plurality of signals for disconnecting the established connection path.

9. A telecommunication network structure comprising:

a plurality of regional service points, each having subordinated units connected thereto;

trunk lines which extend between the regional service points;

a service control point which controls one of the first regional service points; and a signal net having an access point in the service control point and an access point in each of said plurality of regional service points for signal transmission, for signalling of services, functions and connection set-ups from the service control point to subordinate service points.

10. A network structure according to claim 9, wherein a plurality of several service control points each have subordinated units connected thereto and are included in the telecommunication network structure; and the signal net has an access point in each of the service control points.

11. A network structure according to claim 10, wherein each regional service point includes a physical interface to connect switching equipment for establishing originating and terminating connections to the subordinated units and computer means and software for controlling the switching equipment.

12. A network structure according to claim 10, wherein each service control point includes access points to the subordinated regional service points, a plurality of service control signal generating means for producing signals for controlling services, functions and connection set-ups to the subordinated service points, computer means and software for controlling said plurality of service control signal generating means and database means containing information concerning the regional service points of said telecommunication network structure and the subordinate units which are subordinated to said subordinated regional service points, and information concerning the access points of said subordinated units to said subordinated regional service points.

* * * * *